United States Patent [19]
Kim et al.

[11] Patent Number: 6,115,822
[45] Date of Patent: Sep. 5, 2000

[54] POWER DISTRIBUTION UNIT FOR DETECTING SYSTEM STATUS

[75] Inventors: Hyung-Sun Kim; In-Ho Lee, both of Seoul; Han-Yeon Cho, Suwon; Myong-Jae Gil; Myung-Woo Lee, both of Seoul, all of Rep. of Korea

[73] Assignee: SamSung Electronics Co., Ltd., Kyungki-do, Rep. of Korea

[21] Appl. No.: 09/081,649

[22] Filed: May 20, 1998

[30] Foreign Application Priority Data

Jul. 9, 1997 [KR] Rep. of Korea .................. 97-31716

[51] Int. Cl.[7] .................. G06F 1/26; G06F 1/28; G06F 1/30
[52] U.S. Cl. .................. 713/310; 713/300; 713/324; 713/340; 365/226; 365/227; 365/228; 365/229; 307/65; 364/528.3
[58] Field of Search .................. 713/300, 310, 713/324, 340; 365/226–229; 307/65; 364/528.3

[56] References Cited

U.S. PATENT DOCUMENTS

| | | |
|---|---|---|
| 4,677,566 | 6/1987 | Whittaker et al. . |
| 5,283,905 | 2/1994 | Saadeh et al. . |
| 5,404,541 | 4/1995 | Hirosawa .................. 713/324 |
| 5,469,282 | 11/1995 | Ishioka .................. 359/110 |
| 5,481,730 | 1/1996 | Brown et al. . |
| 5,511,205 | 4/1996 | Kannan et al. . |
| 5,579,524 | 11/1996 | Kikinis . |
| 5,596,758 | 1/1997 | Yatsuzuka . |
| 5,652,891 | 7/1997 | Kitamura et al. . |
| 5,652,892 | 7/1997 | Ugajin . |
| 5,809,311 | 9/1998 | Jones .................. 713/300 |
| 5,917,253 | 6/1999 | Rusnack .................. 307/64 |

*Primary Examiner*—Ayaz R. Sheikh
*Assistant Examiner*—Frantz Blanchard Jean
*Attorney, Agent, or Firm*—Robert E. Bushnell, Esq.

[57] ABSTRACT

A power distribution unit that can detect system status includes: an optional line filter, a live power source for driving a I2C device, a power sensor which monitors system power status in connection with the I2C device through a I2C BUS, and a relay and on/off switch circuit which turns on/off system power in accordance with the I2C device through the I2C BUS.

16 Claims, 2 Drawing Sheets

POWER DISTRIBUTION UNIT FOR DETECTING SYSTEM STATUS

CLAIM OF PRIORITY

This application makes reference to, incorporates the same herein, and claims all benefits accruing under 35 U.S.C. §119 from an application for POWER DISTRIBUTION UNIT THAT CAN DETECT SYSTEM STATUS earlier filed in the Korean Industrial Property Office on the $7^{th}$ of July 1997 and there duly assigned Ser. No. 31716/1997.

BACKGROUND OF THE INVENTION

1. Technical Field

The present invention relates to a Power Distribution Unit (PDU) that can detect system status. In particular, the invention relates to a PDU in which a I2C device driving power source is disposed therein, and which can turn AC power on and off by remotely monitoring system power as needed except when AC power fails.

2. Related Art

The earlier PDU shared system power and I2C power or used power supply units which were disposed exterior of the PDU for the I2C power. That is, it did not use power which was directly supplied from the PDU.

The earlier PDU uses a line filter, a power sensor which monitors the status of system power in accordance with a I2C device, and a relay and on/off switch circuit which turns the system power on and off in response to the I2C device through a I2C BUS.

The line filter filters AC supplied to said PDU and supplies AC to system power and the I2C device through a power sensor disposed within the PDU and the relay and on/off switch circuit.

The power sensor senses the power status of the system and transfers the power status information to the I2C device through the I2C BUS.

The relay and on/off switch circuit turns system power on and off by switching on/off according to system power information monitored by a management unit, which is delivered through the I2C BUS by the I2C device.

However, since the I2C device is driven by the same power source that is supplied to said system power, it cannot be turned on/off separately from the system power. Therefore, when DC power or system power fails, the system management unit with the system status information also shuts down. Consequently, when DC power or system power fails, problems in system status cannot be monitored via the I2C device. As well, the stability of the I2C power was low because directly supplied power from the PDU was not used, and it was not possible to remotely turn system power on and off in an emergency.

The patent to Saadeh et al., U.S. Pat. No. 5,283,905, entitled Power Supply For Computer System Manager, discloses a power supply arrangement in which the power supply has its own secondary power source operable when input power to a computer system manager no longer meets preset threshold values.

The patent to Kikinis, U.S. Pat. No. 5,579,524, entitled Optimized Power Supply System For Computer Equipment, discloses a power supply system for a general purpose computer which has plural power supplies for powering selected groups of components. One of the power supplies serves the keyboard and its controller and the keyboard controller is configured to turn the other power supplies on and off in response to user input at the keyboard.

The patent to Ugajin, U.S. Pat. No. 5,652,892, entitled Method And Apparatus For Controlling Remote Power Source, discloses a remote power source control for a system having a plurality of information processing apparatus interconnected by a network or network capable of controlling remote power sources. Each information processing apparatus is provided with a remote power source controller which is always operated by an auxiliary power source.

The following additional patents each disclose features in common with the present invention but are not as pertinent as the patents discussed in detail above: U.S. Pat. No. 5,481,730 to Brown et al., entitled Monitoring And Control Of Power Supply Functions Using A Microcontroller, U.S. Pat. No. 5,596,758 to Yatsuzuka, entitled Memory Protecting Device For Use In Compact Electronic Apparatus Equipped With An External Power Supply, U.S. Pat. No. 4,677,566 to Whittaker et al., entitled Power Control Network For Multiple Digital Modules, U.S. Pat. No. 5,511,205 to Kannan et al., entitled System For Distributed Power Management In Portable Computers, and U.S. Pat. No. 5,652,891 to Kitamura et al., entitled Computer Apparatus And External Storage Device Which Can Be Used By External Power And Internal Power Source.

While each of the aforecited patents discloses features in common with the present invention, none of them teaches or suggests a power distribution unit that can detect system status in accordance with the present invention.

SUMMARY OF THE INVENTION

The present invention has been provided to solve the above problem, and the object of the present invention is to provide a power distribution unit using a I2C device which is directly supplied with power by the PDU and can remotely turn AC power on and off in an emergency by: 1) monitoring problems in system status by operating a system management unit when the system is down, except when AC fails, 2) increasing the stability of the I2C power, and 3) remotely turning AC power on and off in emergencies by monitoring total system power through the I2C BUS.

In carrying out our invention in one preferred mode, the PDU senses system status, and includes an optional line filter, live power source for only driving a I2C device, a power sensor for monitoring system power status, and relay and on/off switch circuit disposed within the PDU and turning on/off system power in accordance with the I2C device through the I2C BUS.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
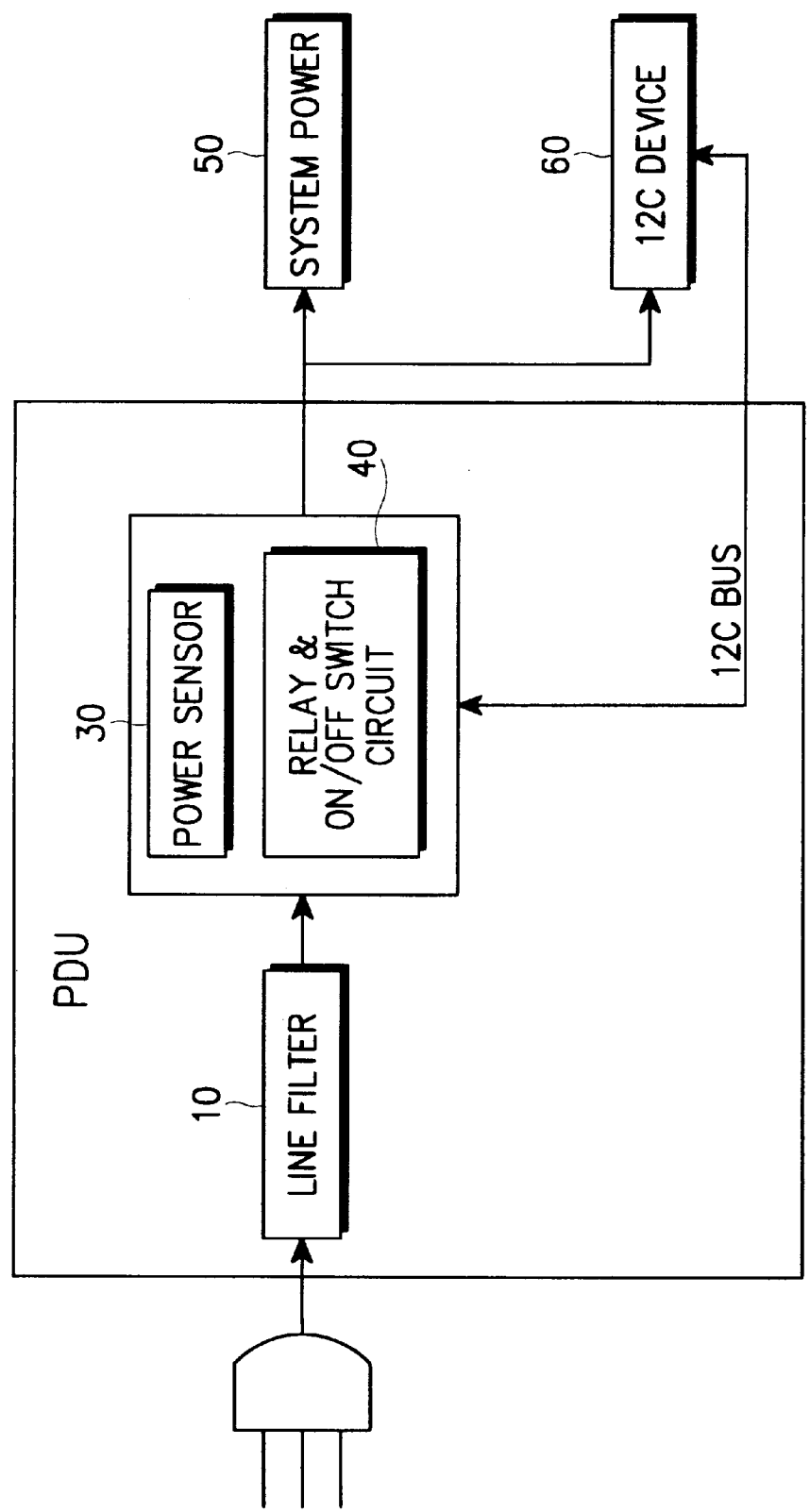
FIG. 1 is a block diagram of the earlier PDU.

FIG. 1 is a block diagram of an earlier PDU discussed above in the Description of the Related Art. The PDU includes a line filter 10, a power sensor 30 which monitors the status of system power 50 in accordance with a I2C device 60 and a relay and on/off switch circuit 40 which turns the system power 50 on and off in response to the I2C device 60 connected to power sensor 30 and switch circuit 40 through a I2C BUS.

To achieve the above objects, an example of a preferable embodiment of a PDU that senses system status pursuant to the invention uses a line filter, a live power source driving a I2C device, a power sensor for monitoring system power status, and relay and on/off switch circuit disposed within the PDU which turns on and off system power in accordance with the I2C device through the I2C BUS.

In the present invention, it is preferable that the live power source is a separate power source isolated from said system power and only drives said I2C device directly by power supplied from the PDU.

It is preferable that the power sensor accesses the I2C device and monitors system power status remotely after receiving system power information monitored through a system management unit and received via the I2C BUS.

It is preferable that the relay and on/off switch circuit turn on and off the source of AC power remotely through the I2C BUS by accessing the I2C device when needed.

Figure 2:
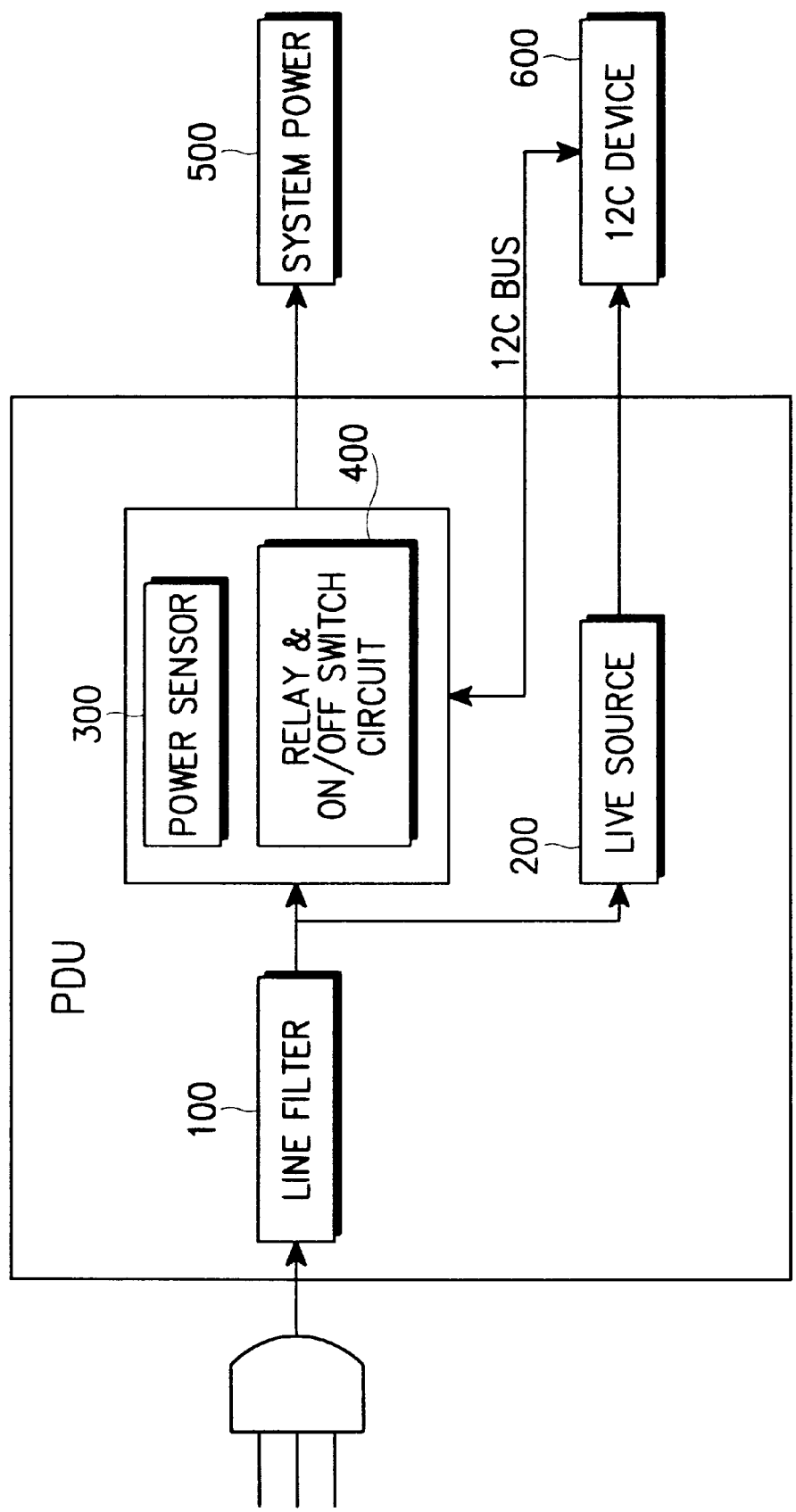
FIG. 2 is a block diagram which depicts the PDU of the present invention.

FIG. 2 is a block diagram which depicts the PDU of the present invention. A line filter 100 supplies AC power to a live power source 200 and a relay and on/off switch circuit 400, which are disposed within the PDU, by filtering AC supplied to the PDU.

The live power source 200 drives a I2C device 600 with AC supplied directly from the line filter 100. That is, the live power source 200, which is a separate power source disposed within the PDU and which is independent of the system power 500, is able to drive the I2C device 600. Accordingly, it allows monitoring of the power status of the system by activating a system management unit when the system is down, and enhances the stability of the I2C power.

The power sensor 300, sensing the power status of the system, routes power status information to the I2C device 600 via the I2C BUS. In this way, even when the system is down, monitoring system status is available by activating the system management unit by accessing the I2C device 600. This is because access is always available, except when AC fails or a UPS fails, as the I2C device 600 is supplied with power from the separate live power source 200, independent of the system power 500 supplied by the PDU. The live power source 200 is a power source which is separate from the system power 500, and which is directly supplied with power from the PDU. Also, as described above, the I2C device 600 is accessible when DC power fails or when the system is down, as it is supplied with power directly from the live power source 200. Consequently, it is possible to remotely monitor the power status of the system by accessing the I2C device 600 when needed.

The relay and on/off switch circuit 400 turns system power 500 on and off by switching on and off according to power information of the system monitored via the system management unit received through the I2C BUS from the I2C device 600. Also, as described above, it is possible to remotely switch the AC power on and off as it is accessible even when DC power fails or the system is down.

By virtue of the invention, it is possible to monitor problems in system status by activating the system management unit in a system which is down by accessing the I2C device which is supplied directly with a live power source from the PDU. Furthermore, in an emergency, such as electric leakage or fire, it allows for protection of the system by switching off AC power by remotely activating the I2C device with the live power source and using I2C BUS.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. In a power distribution unit for detecting system status, said unit comprising:

a first live power source for supplying system power to a I2C device; and a power sensor for monitoring a system power status of the system power and for providing a sensor signal indicative of whether the system power status is on or off;

the improvement comprising:

a second live power source independent of the first live power source and operatively coupled to an input to a power input of a power relay disposed within the power distribution unit;

an on/off switch circuit, disposed within the power distribution unit, coupling a power output of the power relay to a power input of the I2C device and adapted for turning power to the I2C device from the second live power source on and off in accordance with the sensor signal, thereby providing power normally to the I2C device in the event of a power failure in the first live power source.

2. An apparatus according to claim 1, wherein said second live power source comprises a separate power source, isolated from said first live power source, and directly driving said I2C device with independent power supplied from the power distribution unit.

3. The power distribution unit for detecting system status as set forth in claim 2, further comprising a line filter for filtering AC line voltage.

4. An apparatus according to claim 1, wherein said power sensor accessing said I2C device and remotely monitoring the power status of the system after receiving system power information monitored through a system management unit received via an I2C bus.

5. The power distribution unit for detecting system status as set forth in claim 4, further comprising a line filter for filtering AC line voltage.

6. An apparatus according to claim 1, wherein said relay and said on/off switch circuit turning AC power on and off remotely through an I2C bus by accessing said I2C device when needed.

7. The power distribution unit for detecting system status as set forth in claim 6, further comprising a line filter for filtering AC line voltage.

8. The power distribution unit for detecting system status as set forth in claim 1, further comprising a line filter for filtering AC line voltage.

9. A method of supplying power despite system power failure and detecting system status in a power distribution unit comprising:

supplying power to a I2C device from a first live power source;

monitoring system power status for the I2C device with a power sensor that provides a sensor signal indicative of whether power from the first live power source to the I2C device is on or off;

providing a second live power source for the I2C device via a relay and on/off switch circuit operating responsively to the sensor signal;

turning power from the second live power source to the I2C device on and off in accordance with the sensor signal, whereby power is supplied to the I2C device from the second live power source when the first live power source is dead.

10. The method as set forth in claim 9, the I2C device being directly supplied from the live power source comprising a separate power source isolated from said system power.

11. A method according to claim 9, wherein the power sensor accesses the I2C device and remotely monitors the power status of the system after receiving system power information monitor through a system management unit received via an I2C bus.

12. A method according to claim 9, wherein the relay and on/off switch circuit turns AC power on/off remotely through an I2C bus by accessing the I2C device when needed.

13. A power distribution unit for detecting system status, comprising:

an I2C bus;

a relay and switching circuit operationally responsive to signals transmitted via said I2C bus, said circuit having a first input terminal disposed to receive electrical power and a first output terminal disposed to supply said electrical power to a power consuming system;

a power sensor operationally coupled to said I2C bus, monitoring status of a local power consuming system coupled to receive said electrical power from said switching circuit; and a live power source having a second input terminal coupled to receive said electrical power separately from and independently of said switching circuit, and an output terminal dedicated to supplying said electrical power directly to an I2C device operationally coupled to said I2C bus to respond to indications of said status provided by said power sensor via said I2C bus and to drive said switching circuit by transmitting said signals via said I2C bus.

14. The power distribution unit of claim 13, with said live power source comprising a separate power source, isolated from said system power, and directly driving said I2C device with power supplied from the power distribution unit.

15. The power distribution unit of claim 13, with said power sensor accessing said I2C device and remotely monitoring the power status of the system after receiving system power information monitored through a system management unit received via said I2C bus.

16. The power distribution unit of claim 13, with said switching circuit controlling said supply in dependence upon said signals after periodically accessing the I2C device via said I2C bus.

* * * * *